US010503239B2

(12) United States Patent
Bito

(10) Patent No.: US 10,503,239 B2
(45) Date of Patent: Dec. 10, 2019

(54) ELECTRONIC DEVICE AND POWER MANAGEMENT METHOD

(71) Applicant: TOSHIBA MEMORY CORPORATION, Tokyo (JP)

(72) Inventor: Akinori Bito, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 76 days.

(21) Appl. No.: 15/905,824

(22) Filed: Feb. 27, 2018

(65) Prior Publication Data

US 2019/0064909 A1 Feb. 28, 2019

(30) Foreign Application Priority Data

Aug. 29, 2017 (JP) ................. 2017-164431

(51) Int. Cl.
*G06F 1/32* (2019.01)
*G06F 3/06* (2006.01)
*H04L 12/00* (2006.01)
*H04L 12/12* (2006.01)
*G06F 1/3234* (2019.01)
*G06F 1/3209* (2019.01)
*G06F 1/3215* (2019.01)

(52) U.S. Cl.
CPC ............ *G06F 1/325* (2013.01); *G06F 1/3209* (2013.01); *G06F 1/3215* (2013.01); *G06F 1/3278* (2013.01); *G06F 3/0625* (2013.01); *H04L 12/00* (2013.01); *H04L 12/12* (2013.01)

(58) Field of Classification Search
CPC ...... G06F 1/325; G06F 1/3209; G06F 1/3215; G06F 1/3278; G06F 3/0625; H04L 12/00; H04L 12/12
See application file for complete search history.

(56) References Cited

U.S. PATENT DOCUMENTS 7,424,628 B2    9/2008  Matsumoto et al.
7,809,969 B2 *  10/2010 Das Sharma ......... G06F 1/3203
                                                      710/305

(Continued)

FOREIGN PATENT DOCUMENTS

JP    2005-216046 A    8/2005
JP    2014-527329 A   10/2014
JP    2016-123076 A    7/2016

*Primary Examiner* — Stefan Stoynov
(74) *Attorney, Agent, or Firm* — Kim & Stewart LLP

(57) ABSTRACT

An electronic device is connectable with a host via a serial interface including a link configured with a plurality of lanes, each of which includes a differential signal wire pair for transmission and a differential signal wire pair for reception. The electronic device includes a plurality of transmitter circuits that respectively transmit data via the differential signal wire pair for transmission of each of the corresponding lanes, a plurality of receiver circuits that respectively receive data via the differential signal wire pair for reception of each of the corresponding lanes, and a control circuit. The control circuit causes a state of the electronic device to transition from a normal operation state to a state in which the plurality of transmitter circuits are maintained in an active state and the plurality of receiver circuits are in an inactive state except for one receiver circuit corresponding to one of the lanes.

20 Claims, 14 Drawing Sheets

(56) References Cited

U.S. PATENT DOCUMENTS

| | | |
|---|---|---|
| 9,122,481 B2 | 9/2015 | Unnikrishnan et al. |
| 9,141,162 B2 * | 9/2015 | Narayanan ............ G06F 1/3287 |
| 9,563,260 B2 * | 2/2017 | Wagh ................ H04W 52/0203 |
| 2016/0179427 A1 | 6/2016 | Jen et al. |

* cited by examiner

FIG. 3

| LINK STATE | POWER CONSUMPTION | RECOVERY LATENCY |
|---|---|---|
| L0 | ↓ LARGE | ↑ SHORT |
| L0s | | |
| L1.0 | ▼ SMALL | LONG |

FIG. 5

| | Lane | Tx | Rx |
|---|---|---|---|
| Advanced L0 | 0 | Active | Active |
| | 1 | Active | Inactive |
| | 2 | Active | Inactive |
| | 3 | Active | Inactive |

FIG. 12

| | Lane0 | Lane1 | Lane2 | Lane3 | Lane4 | Lane5 | Lane6 | Lane7 |
|---|---|---|---|---|---|---|---|---|
| Sync Hdr | 0/1 | 0/1 | 0/1 | 0/1 | 0/1 | 0/1 | 0/1 | 0/1 |
| Symbol 0 | ←——— STP ———→ | | | | ←——— TLP header (DW0) ———→ | | | |
| Symbol 1 | ←——————— TLP header (DW1,2) ———————→ | | | | | | | |
| Symbol 2 | ←——— TLP header (DW3) ———→ | | | | ←——— Data (1DW) ———→ | | | |
| Symbol 3 | ←——— LCRC ———→ | | | | IDL | IDL | IDL | IDL |
| Symbol 4 | ⋮ | ⋮ | ⋮ | ⋮ | ⋮ | ⋮ | ⋮ | ⋮ |

TIME →

FIG. 13

| LINK STATE | POWER CONSUMPTION |
|---|---|
| L0 | LARGE |
| L0s | ↓ |
| Advanced L0 | |
| L1.0 | SMALL |

ELECTRONIC DEVICE AND POWER MANAGEMENT METHOD

CROSS-REFERENCE TO RELATED APPLICATION

This application is based upon and claims the benefit of priority from Japanese Patent Application No. 2017-164431, filed Aug. 29, 2017, the entire contents of which are incorporated herein by reference.

FIELD

Embodiments described herein relate generally to a technology for communication via a serial interface including a link configured with a plurality of lanes.

BACKGROUND

In recent years, a serial interface which connects devices to each other has been widely used. The serial interface can perform high-speed data transfer between the devices. Many devices that require high-speed data transfer support the serial interface. Examples of the devices include various electronic devices. Each of the devices can communicate with a host via the serial interface between the device and the host.

In addition, each of the devices may transition from a normal operation state to a low-power state by negotiation with the host. For example, according to active state power management (ASPM) which is a protocol defined in the PCI Express specification, only when a function of the ASPM is enabled by the host, the device can start the transition from the normal operation state to the low-power state.

Therefore, even in a case where no data are transferred via a link, if the function of ASPM is not enabled by the host, the device cannot enter the low-power state. This causes an increase in power consumption of the device.

DESCRIPTION OF THE DRAWINGS

FIG. 3 is a diagram illustrating a relationship of link states L0, L0s, and L1.0.

FIG. 5 is a diagram illustrating a new low-power state achieved by the electronic device of the embodiment.

FIG. 12 is a diagram illustrating a TLP layout in an x8 link.

FIG. 13 is a diagram illustrating a relationship of L0, L0s, L1.0, and Advanced L0.

DETAILED DESCRIPTION

Figure 1:
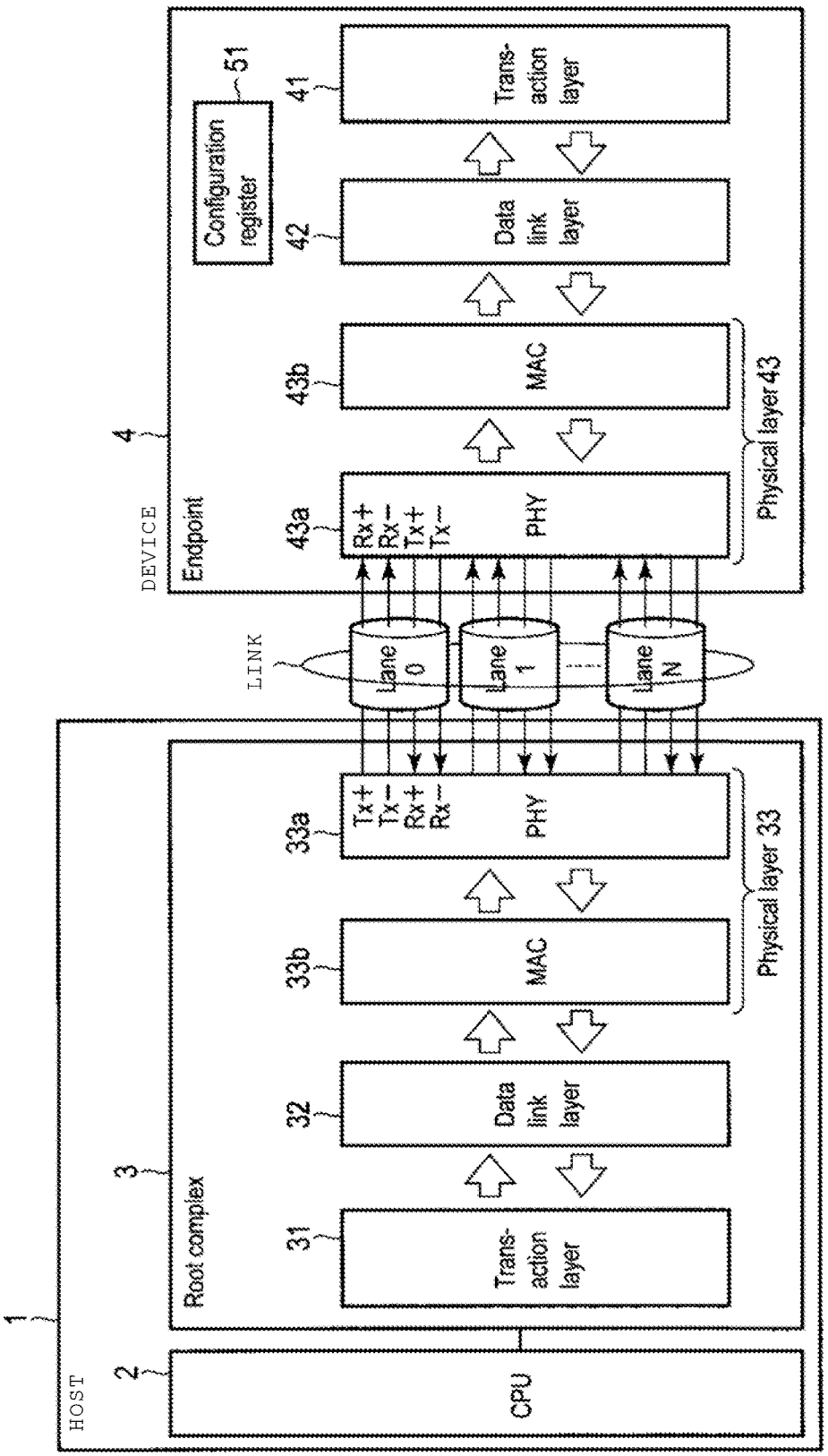
FIG. 1 is a block diagram of an electronic device according to an embodiment.

Embodiments provide an electronic device which can use a new low-power state to which the electronic device can transition without negotiating with a host, and a power management method.

In general, according to the embodiment, there is provided an electronic device which is connectable with a host via a serial interface including a link configured with a plurality of lanes, each of which includes a differential signal wire pair for transmission and a differential signal wire pair for reception. The electronic device includes a plurality of transmitter circuits that respectively correspond to the plurality of lanes and is configured to transmit data via the differential signal wire pair for transmission of each of the corresponding lanes, a plurality of receiver circuits that respectively correspond to the plurality of lanes and is configured to receive data via the differential signal wire pair for reception of each of the corresponding lanes, and a control circuit. The control circuit is configured to allow a state of the electronic device to transition from a normal operation state in which the plurality of transmitter circuits and the plurality of receiver circuits are in an active state, to a first low-power state in which the plurality of transmitter circuits are maintained in an active state and the plurality of receiver circuits are in an inactive state except for one of the receiver circuits corresponding to one lane among the plurality of lanes.

Hereinafter, an embodiment will be described with reference to the drawings.

First, a configuration of an electronic device according to the embodiment will be described with reference to FIG. 1.

The electronic device is implemented as a device 4 which is connectable with a host 1 via a serial interface. The serial interface includes a serial link which connects devices to each other. In FIG. 1, a case where the device 4 is connected to the host 1 via a link including a plurality of lanes is illustrated as an example.

The link includes a plurality of lanes, that is, lane 0, lane 1, . . . , and lane N. Each of the lanes includes a differential signal wire pair for reception (Rx+, Rx−) and a differential signal wire pair for transmission (Tx+, Tx−). Each of the lanes is also referred to as a logical lane. The device 4 can execute data transmission and data reception at the same time via the link configured with the lane 0, the lane 1, . . . , and the lane N.

An example of a standard of a serial interface including the link configured with the lanes includes a PCI Express®.

In the serial interface based on the PCI Express specification, an x1 lane, an x2 lane, an x4 lane, an x8 lane, an x12 lane, an x16 lane, and x32 lane are supported.

Hereinafter, a case where the serial interface which connects the device 4 and the host 1 to each other is based on the PCI Express specification will be described as an example. The serial interface that can be used in the embodiment is not limited to the serial interface based on the PCI Express specification, and serial interfaces based on various other serial interface standards including a link having a plurality of lanes may be used.

The host 1 is a device which uses the device 4 as a peripheral device. The host 1 may be an information processing device, such as a personal computer and a server, and may be an audio and video product, such as a camera.

The host 1 includes a CPU 2, and a root complex 3 for communicating with the device 4 via the serial interface.

The root complex 3 includes a transaction layer 31, a data link layer 32, and a physical layer 33. The physical layer 33 includes a physical subblock (PHY) 33*a*, and a media access control (MAC) subblock 33*b*.

The device 4 is an I/O device which is referred to as an endpoint. Similar to the root complex 3, the device 4 also includes a transaction layer 41, a data link layer 42, and a physical layer 43. The physical layer 43 includes a physical subblock (PHY) 43*a,* and a media access control (MAC) subblock 43*b*. The transaction layer 41, the data link layer 42, and the physical layer 43 may be implemented with a circuit, such as a system-on-a-chip (SoC).

The transaction layers 31 and 41 are layers for processing the transaction, such as data read and data write. The transaction layers 31 and 41 execute creation and processing of a transaction layer packet (TLP). The TLP is used for transmitting a read/write request and a completion (including data along with a completion with respect to a read request) with respect to the read/write request.

Each of the data link layers 32 and 42 is an intermediate layer between the transaction layer and the physical layer, and executes link management, processing for certainly communicating the TLP, and creation and processing of a data link layer packet (DLLP). The DLLP includes a DLLP for transmitting flow control information (for example, Update FC DLLP), an Ack DLLP for transmitting acknowledgement, and a Nak DLLP for transmitting negative acknowledgement which is interpreted as a retransmission request.

The physical layers 33 and 43 execute an interface operation for physically communicating the data via the plurality of lanes included in the link. Each of the physical layers 33 and 43 includes various circuits for the interface operation. In a case where the serial interface is based on a third generation PCI Express specification (Gen 3), the circuits generally include a driver, an input buffer, a parallel to serial converter circuit (serializer), a serial to parallel converter circuit (de-serializer), a 128*b*/130*b* encoder, a 128*b*/130*b* decoder, a scrambler, a descrambler, a framing circuit, and a de-framing circuit. In addition, the serial interface to which the embodiment is applicable is not limited to the third generation PCI Express specification (Gen 3), and may be a first generation PCI Express specification (Gen 1), or may be a second generation PCI Express specification (Gen 2). In Gen 1 or Gen 2, each of the physical layers 33 and 43 includes an 8*b*/10*b* encoder and an 8*b*/10*b* decoder instead of the 128*b*/130*b* encoder and the 128*b*/130*b* decoder.

The driver drives the differential signal wire pair for transmission for transmitting the data. The input buffer is a circuit which receives a signal from the differential signal wire pair for reception, and includes, for example, an equalizer. The parallel to serial converter circuit (serializer) converts the transmitted data from the parallel data to the serial data. The serial to parallel converter circuit (de-serializer) converts the received serial data to the parallel data. The 128*b*/130*b* encoder performs 128*b*/130*b* encoding with respect to the transmitted data in order to reduce intersymbol interference and embeds a clock in the transmitted data. The 128*b*/130*b* decoder decodes the received 128*b*/130*b* encoded data. The scrambler scrambles the transmitted data such that the length in which the same bit values are continuous to each other is equal to or less than a certain length before the 128*b*/130*b* encoding. The descrambler obtains original data by descrambling the scrambled received data.

The framing circuit and the de-framing circuit execute a framing operation and a de-framing operation. The framing operation is an operation for assigning a plurality of pieces of byte data that make up the transmitted data, such as the TLP and the DLLP, in order by a byte unit in the plurality of lanes. The de-framing operation is an operation for combining a plurality of received data streams that correspond to the plurality of lanes, and for regenerating the original data, such as the TLP and the DLLP.

Furthermore, each of the physical layers 33 and 43 has a function of communicating a message which is called an ordered set.

The device 4 further includes a configuration register 51. The configuration register 51 is a register accessible from the host 1, and is used for setting various functions in the device 4 by the host 1. In general, the configuration register 51 is provided on the uppermost layer (e.g., software layer) of the transaction layer 41.

Figure 2:
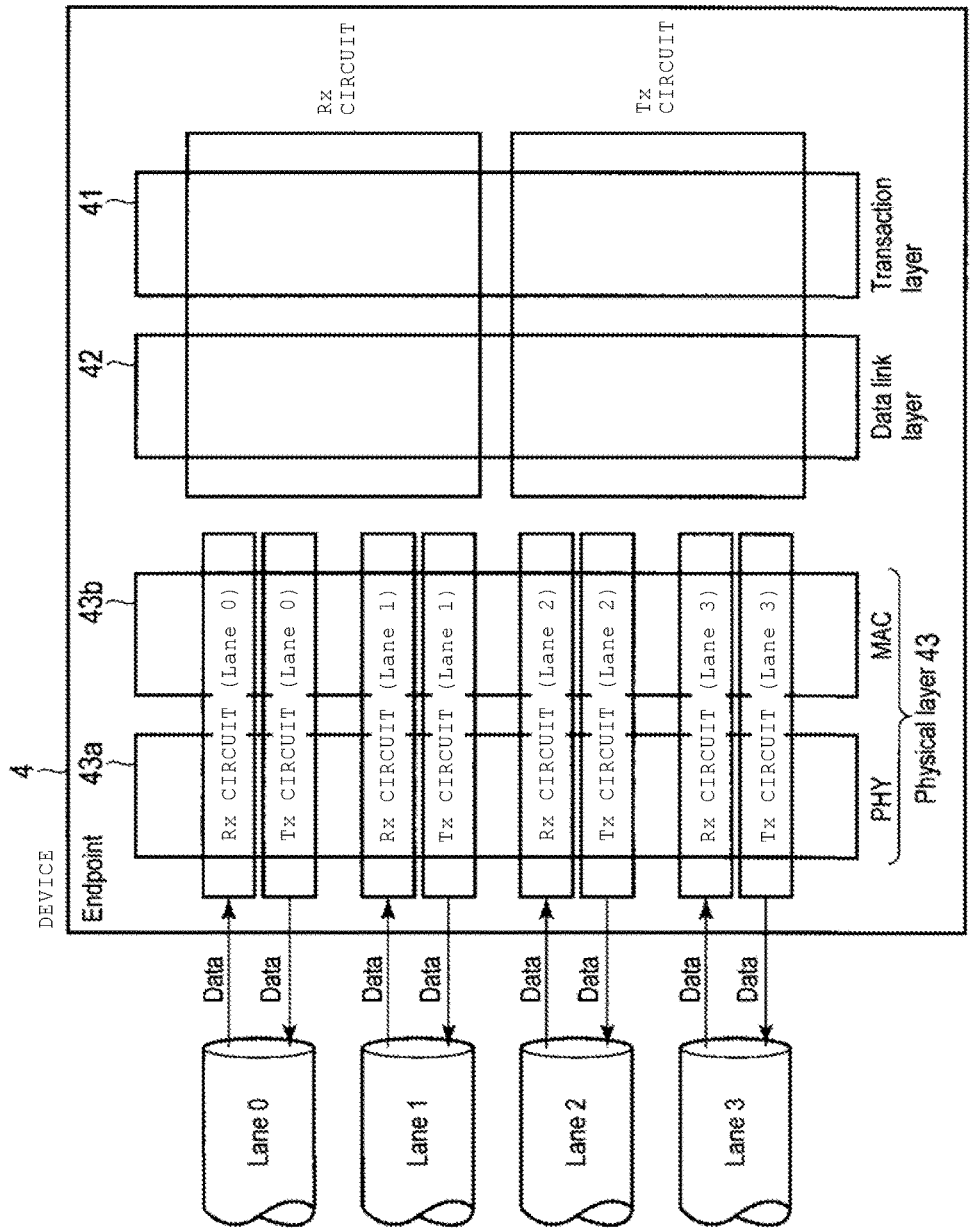
FIG. 2 is a block diagram illustrating a configuration example of each of a physical layer, a data link layer, and a transaction layer which are provided in the electronic device of the embodiment.

FIG. 2 illustrates a configuration example of each of the physical layer 43, the data link layer 42, and the transaction layer 41 which are provided in the device 4.

In FIG. 2, a case where the link is the x4 lane including the lane 0 to the lane 3 is assumed. In addition, in FIG. 2, the differential signal wire pair for reception provided in each of the lanes is expressed by one arrow toward the device 4 from each of the lanes, and the differential signal wire pair for transmission provided in each of the lanes is expressed by one arrow toward each of the lanes from the device 4.

The physical layer 43 of the device 4 includes four receiver circuits (Rx circuit), that is, a receiver circuit corresponding to the lane 0 (Rx circuit (lane 0)), a receiver circuit corresponding to the lane 1 (Rx circuit (lane 1)), a receiver circuit corresponding to the lane 2 (Rx circuit (lane 2)), and a receiver circuit corresponding to the lane 3 (Rx circuit (lane 3)). Each of the receiver circuits (Rx circuit) is a receiver which receives data via the differential signal wire pair for reception of the corresponding lane.

The physical layer 43 of the device 4 also includes four transmitter circuits (Tx circuit), that is, a transmitter circuit corresponding to the lane 0 (Tx circuit (lane 0)), a transmitter circuit corresponding to the lane 1 (Tx circuit (lane 1)), a transmitter circuit corresponding to the lane 2 (Tx circuit (lane 2)), and a transmitter circuit corresponding to the lane 3 (Tx circuit (lane 3)). Each of the transmitter circuits (Tx circuit) is a transmitter which transmits data via the differential signal wire pair for transmission of the corresponding lane.

As described above, since the physical layer 43 executes the framing operation and the de-framing operation, the data link layer 42 and the transaction layer 41 respectively include one common receiver circuit (Rx circuit) for the plurality of lanes (here, the lane 0, the lane 1, the lane 2, and the lane 3), and one common transmitter circuit (Tx circuit) for the plurality of lanes (here, the lane 0, the lane 1, the lane 2, and the lane 3).

Each of the root complex 3 and the device 4 which are described in FIG. 1 supports a plurality of link states (also referred to as link power states).

In the PCI Express specification, the link states, such as L0, L0s, and L1.x are defined. The L0 state is a normal operation state in which the data transmission and data reception are executed, and the L0s state and the L1.x state are low-power states. The L1.x state expresses any one state among several substates of the L1 state which is the low-power state. The L1.0 state is one of the L1 substates.

As illustrated in FIG. 3, the power consumption is reduced in an order of the L0 state, the L0s state, and the L1.0 state.

The time necessary for transition from the L0s to the L0 (recovery latency) is extremely short. The time necessary for transition from the L1.0 to the L0 (recovery latency) is longer than the time necessary for transition from the L0s to L0.

In the active state power management (ASPM) defined in the PCI Express specification, only in a case where the function of the ASPM (ASPM L0s or ASPM L1.0) is enabled by the host 1, the device 4 can transition from the L0 state (normal operation state) to the L0s state, or from the L0 state (normal operation state) to the L1.0 state. In other words, only in a case where the L0s state (ASPM L0s) is enabled by the host 1, the device 4 can transition from the L0 state to the L0s state when a condition, such as a condition that the TLP to be transmitted does not exist during a certain period, is satisfied. Similarly, only in a case where the L1.0 state (ASPM L1.0) is enabled by the host 1, the device 4 can transition from the L0 state to the L1.0 state when a condition, such as a condition that the TLP to be transmitted does not exist during a certain period, is satisfied.

Meanwhile, enablement/disablement of the low-power state (ASPM L0s or ASPM L1.0) are controlled by the root complex 3 of the host 1. Therefore, the device 4 cannot transition to the low-power state by itself.

Here, a case where the ASPM L0s is enabled means a case where the device 4 is allowed to transition from the L0 state to the L0s state. Similarly, a case where the ASPM L1.0 is enabled means a case where the device 4 is allowed to transition from the L0 state to the L1.0 state.

If the ASPM L0s is not enabled by the host 1, the device 4 cannot transition from the L0 state to the L0s state. Similarly, if the ASPM L1.0 is not enabled by the host 1, the device 4 cannot transition from the L0 state to the L1.0 state.

Figure 4:
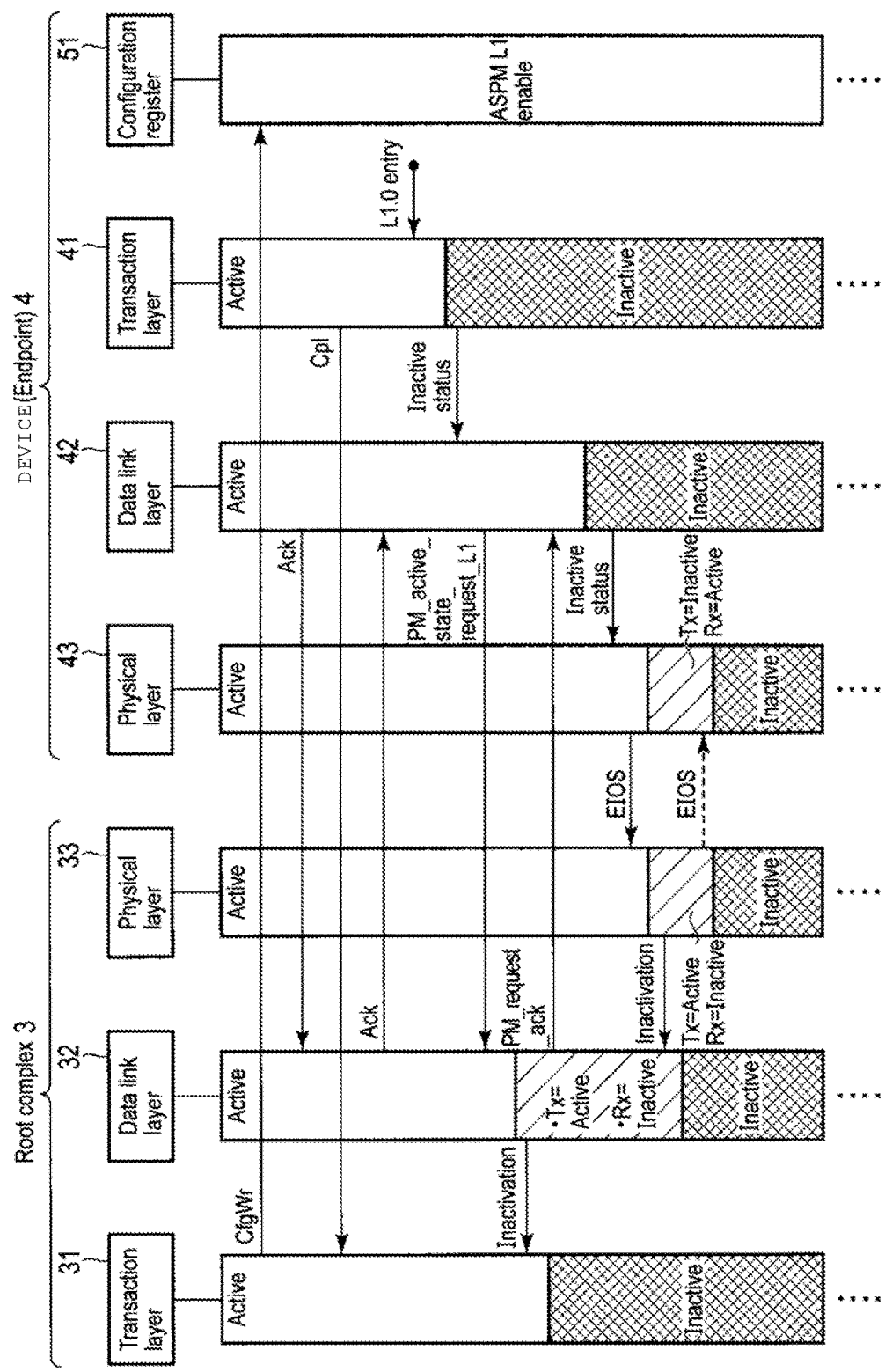
FIG. 4 is a diagram illustrating a transition sequence of ASPM L1.0.

FIG. 4 illustrates an example of a transition sequence to the L1.0 (ASPM L1.0).

The root complex 3 transmits a TLP (configuration write request: CfgWr) which is a request to enable the ASPM L1.0, to the device 4. When the device 4 receives the request (CfgWr), a value indicating that the ASPM L1.0 is enabled is set in the configuration register 51 in the device 4. The device 4 transmits an acknowledgement (Acknowledgement: Ack) and a completion (Completion: Cpl) with respect to the request, to the root complex 3, and the root complex 3 transmits an acknowledgement (Acknowledgement: Ack) with respect to the completion, to the device 4.

In addition, when a condition (such as the condition that the TLP to be transmitted does not exist during the certain period) is satisfied, the device 4 may determine that the link state of the device 4 enters the L1.0 state (L1.0 Entry). The determination may be executed by a component in the device 4 which is referred to as power management controller (e.g., power management controller 52 shown in FIG. 6). The power management controller may be implemented by a part of the circuit in the SoC, or may be implemented by a program (firmware) executed by a processing circuit (processor) in the SoC. Otherwise, the power management controller may be implemented by a circuit different from the SoC, or may be implemented by a program executed by the processor of the software layer.

When the device 4 determines that the link state enters the L1.0 state, a handshake for negotiation between the device 4 and the host 1 is started. In addition, in the device 4, the transaction layer 41, the data link layer 42, and the physical layer 43 transition from the active state to the inactive state in order. Similarly, in the root complex 3 of the host 1, the transaction layer 31, the data link layer 32, and the physical layer 33 transition from the active state to the inactive state in order.

Here, a case where a certain layer is in the active state means a case where the layer is in the normal operation state in which data can be communicated. In addition, a case where a certain layer is in the inactive state means a case in which the layer is in a state of not being operated, that is, a case where the layer enters the low-power state.

The negotiation between the device 4 and the host 1 is executed as follows.

First, the transaction layer 41 of the device 4 transitions from the active state to the inactive state, and at the same time, a notification of the inactive status indicating that the transaction layer 41 is transitioning to the inactive state is sent out to the data link layer 42.

In response to the reception of the inactive status, the data link layer 42 transmits PM_active_state_request_L1 which is a DLLP for requesting the entry to the L1.0, to the root complex 3.

In the root complex 3, when the data link layer 32 receives the PM_active_state_request_L1, an operation stop instruction is sent to the transaction layer 31 from the data link layer 32. In response to the operation stop instruction (inactivation), the transaction layer 31 transitions from the active state to the inactive state. In the data link layer 32, while the transmitter circuit (Tx) of the data link layer 32 is maintained in the active state, the receiver circuit (Rx) of the data link layer 32 enters the inactive state. In addition, the data link layer 32 transmits an acknowledgement with respect to the PM_active_state_request_L1 (PM_request_ack), to the device 4.

In the device 4, when the data link layer 42 receives the PM_request_ack, the data link layer 42 transitions from the active state to the inactive state, and at the same time, a notification indicating that the data link layer 42 transitions to the inactive state is sent to the physical layer 43 from the data link layer 42.

In response to the reception of the notification of the inactive status, the physical layer 43 transmits an electrical idle ordered set (EIOS) to the root complex 3 before each of the lanes in the link enters an electrical idle state. The EIOS is an ordered set for notifying a counterpart side of a state where each of the lanes in the link enters the electrical idle state. In addition, each of the transmitter circuits (Tx) of the physical layer 43 transitions from the active state to the inactive state. Accordingly, in the device 4, the differential signal wire pair for transmission of each of the lanes is not driven, and enters the electrical idle state. In the electrical idle state, Tx+ and Tx− are respectively fixed to a certain potential such that a potential difference between Tx+ and Tx− of each of the lanes is within a certain range.

In the root complex 3, when the physical layer 33 receives the EIOS from the device 4, each of the receiver circuits (Rx) of the physical layer 33 transitions from the active state to the inactive state, and the operation stop instruction (inactivation) is sent to the data link layer 32 from the physical layer 33.

In response to the reception of the inactivation instruction, the transmitter circuit (Tx) of the data link layer 32 transitions to the inactive state, and according to this, the overall data link layer 32 enters the inactive state.

After this, before each of the lanes enters the electrical idle state, the physical layer 33 transmits the EIOS to the device 4, and according to this, the state where each of the lanes enters the electrical idle state is notified to the device 4. In addition, each of the transmitter circuits (Tx) of the physical layer 33 transitions from the active state to the inactive state. Accordingly, the overall physical layer 33 enters the inactive state.

In the device 4, when the physical layer 43 receives the EIOS from the root complex 3, each of the receiver circuits (Rx) of the physical layer 43 transitions from the active state to the inactive state. Accordingly, the overall physical layer 43 enters the inactive state.

In this manner, only in a case where the ASPM L1.0 is enabled by the host 1 (that is, the root complex 3), the device 4 is allowed to transition to the L1.0. In addition, in order to allow the state of the device 4 to transition to the L1.0, it is necessary to execute the negotiation (handshake) with the host 1 (root complex 3).

In the embodiment, without executing the negotiation with the host 1 (root complex 3), a new low-power state to which the device 4, by itself, can transition is supported. Hereinafter, the new low-power state is referred to as Advanced L0.

The Advanced L0 is a link state where the power consumption of the device 4 can be reduced while allowing the host 1 (root complex 3) to recognize as if the device 4 is still in the L0. The device 4 can transition to the Advanced L0 regardless whether or not the ASPM L0s/ASPM L1.0 is enabled.

In the Advanced L0, basically, the plurality of transmitter circuits (Tx circuit) and the plurality of receiver circuits (Rx circuit) provided in the physical layer 43 are controlled as follows.

Control of Transmitter Circuit

The plurality of transmitter circuits (Tx circuit) provided in the physical layer 43 are maintained in the active state. Accordingly, since the differential signal wire pair for transmission of each of the lanes does not enter the electrical idle state, it is possible to allow the host 1 to recognize as if the device 4 is still in the L0.

During the period of the Advanced L0, the device 4 can transmit the signal indicating logical idle (idle token: IDL Token), the data for flow control (Update FC DLLP) and the like to the host 1.

The idle token (IDL Token) indicates that the link between the device 4 and the host 1 is in a logical idle state. The idle token (IDL Token) includes a bit pattern all of which is "0". The idle token (IDL Token) is generated by the physical layer 43, and the scrambled idle token (IDL Token) is transmitted. During the period of the logical idle state where the TLP, the DLLP, and other framing tokens are not communicated, the idle token (IDL Token) is always communicated. Accordingly, the host 1 can maintain a state where synchronization (i.e., bit synchronization and symbol synchronization/block alignment) with a clock signal on the transmission side (device 4) is established.

The Update FC DLLP is a DLLP used for flow control that adjusts a TLP transmission amount by the host 1. The Update FC DLLP indicates a current size of a receiving buffer in the device 4 for receiving the TLP from the host 1.

Control of Receiver Circuit

The plurality of receiver circuits, except for the Rx circuit corresponding to one certain lane, provided in the physical layer 43 are set to be in an inactive state. In other words, all of the receiver circuits enter the inactive state except for the receiver circuit corresponding to one lane among the plurality of lanes. The reason why the receiver circuit corresponding to one lane is maintained in the active state is so that the device 4 can recover from the Advanced L0 to the L0 in response to a reception of a certain data transmitted from the host 1.

One example of the data transmitted from the host 1 that can be used as a recovery event is the EIOS. Before the host 1 enters the L0s, the host 1 serially transmits the EIOS to each of the lanes. In the Advanced L0, since the receiver circuit corresponding to one lane is in the active state, the device can detect the reception of the EIOS from the host 1 based on the received data of the lane, and in order to enter L0s defined in the PCI Express specification, it is possible to recover from the Advanced L0 to L0.

Another example of the data transmitted from the host 1 that can be used as the recovery event is a TLP. In the packet, such as the TLP and the DLLP, the framing is performed such that the initial byte data is placed in the lane 0 and a plurality of pieces of byte data are mapped in all of the lanes in the link. In this case, the initial byte data of the TLP is a token indicating the start of the TLP (STP: Start of a Transaction Layer Packet). Therefore, at least a part of the STP token is necessarily received via the lane 0. The lane 0 is a lane to which a lane number 0 is assigned. Therefore, it is preferable that the receiver circuit corresponding to the one lane maintained in the active state is the receiver circuit of the lane 0. In this case, the device 4 cannot correctly receive all of the TLP from the host 1, but at least, it is possible to detect the TLP transmitted from the host 1 based on the received data of the lane 0, and to recover from the Advanced L0 to the L0. After the device 4 recovers from the Advanced L0 to the L0, the device 4 may request retransmission of the TLP, to the host 1.

FIG. 5 illustrates a state of each of the plurality of transmitter circuits and the plurality of receiver circuits in the physical layer 43 in the Advanced L0.

Here, a case where the link is the x4 lane is assumed.

The physical layer 43 includes four transmitter circuits that correspond to the lanes 0 to 3, and four receiver circuits that correspond to the lanes 0 to 3.

In the L0, all of the four transmitter circuits are in the active state, and all of the four receiver circuits are also in the active state.

In the Advanced L0, as illustrated in FIG. 5, all of the four transmitter circuits (Tx circuit) are maintained in the active state, but the four receiver circuits (Rx circuit) enter the inactive state except for the receiver circuit of the lane 0. In other words, among the four receiver circuits (Rx circuit), only the receiver circuit of the lane 0 remains in the active state, and the receiver circuit of the lane 1, the receiver circuit of the lane 2, and the receiver circuit of the lane 3 enter the inactive state.

Figure 6:
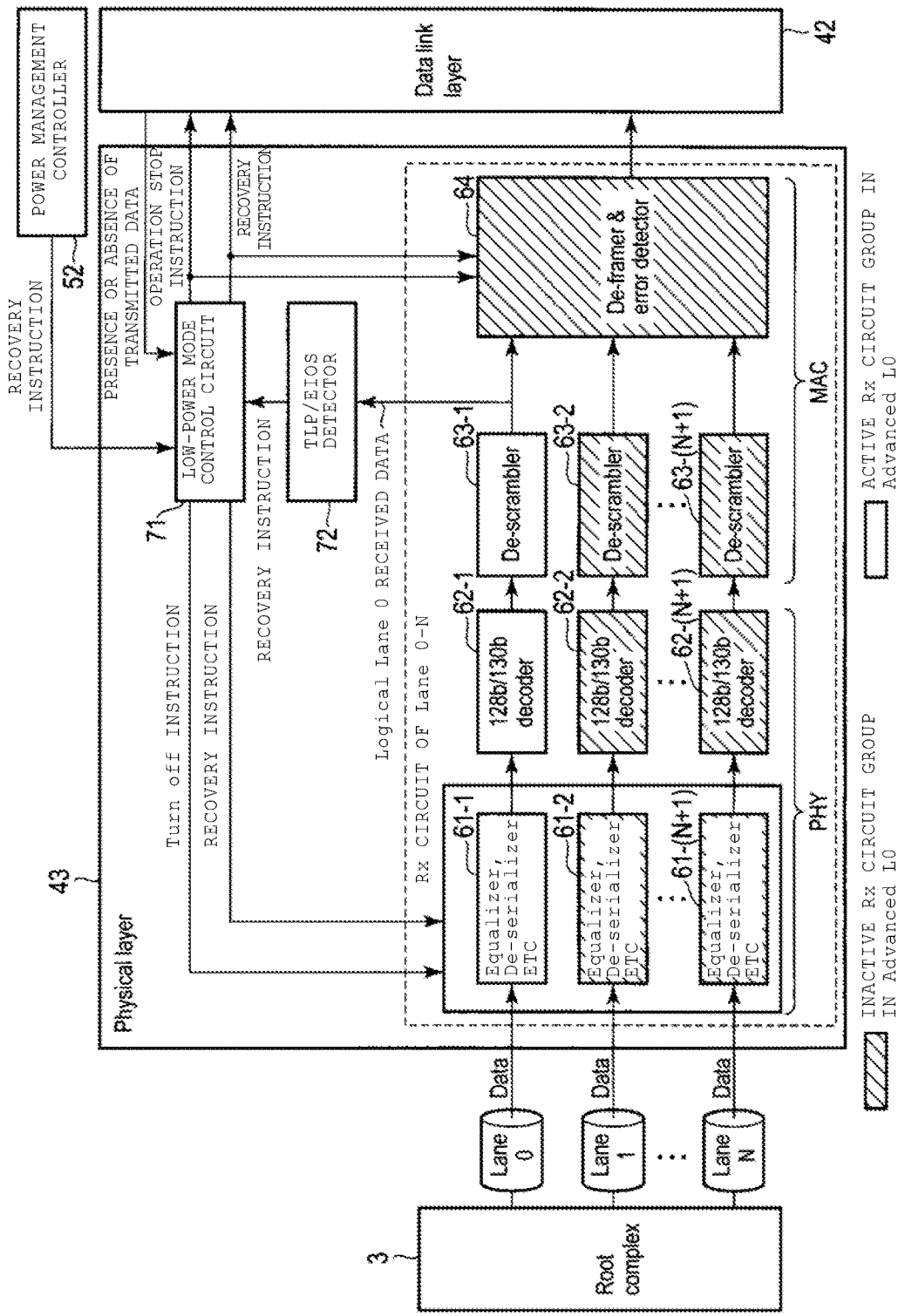
FIG. 6 is a block diagram of the physical layer in the electronic device of the embodiment.

FIG. 6 is a configuration example of the physical layer 43 in the device 4.

The receiver circuit of the physical layer 43 includes circuits 61-1 to 61-(N+1), 128b/130b decoders 62-1 to 62-(N+1), descramblers 63-1 to 63-(N+1), and a de-framer and error detector 64. Each of the circuits 61-1 to 61-(N+1) includes an equalizer and de-serializer.

The circuit 61-1, the 128b/130b decoder 62-1, and the descrambler 63-1 are operated as receiver circuits which receive data via the differential signal wire pair of the lane 0.

The circuit 61-2, the 128b/130b decoder 62-2, and the descrambler 63-2 are operated as the receiver circuits which receive data via the differential signal wire pair of the lane 1.

In addition, the circuit 61-(N+1), the 128b/130b decoder 62-(N+1), and the descrambler 63-(N+1) are operated as the receiver circuits which receive data via the differential signal wire pair of the lane N.

The de-framer and error detector 64 executes the de-framing operation and an error detection operation.

In the Advanced L0, the circuits illustrated by hatching in FIG. 6, that is, the circuits 61-2 to 61-(N+1), the 128b/130b decoders 62-2 to 62-(N+1), the descramblers 63-2 to 63-(N+1), and the de-framer and error detector 64 are set in the inactive state, and meanwhile, the circuit 61-1, the 128b/130b decoder 62-1, and the descrambler 63-1 are maintained in the active state. In order to make the circuits 61-2 to 61-(N+1), the 128b/130b decoders 62-2 to 62-(N+1), the descramblers 63-2 to 63-(N+1), and the de-framer and error detector 64 be in the inactive state, clock signals supplied to the circuits may be gated.

The physical layer 43 further includes a low-power mode control circuit 71 and a TLP/EIOS detector 72. The low-power mode control circuit 71 and the TLP/EIOS detector 72 are control circuits which cause the link state of the device 4 to transition from the L0 (normal operation state) to the Advanced L0, and cause the link state of the device 4 to transition from the Advanced L0 to the L0.

When the condition, such as the condition that the data (TLP) to be transmitted does not exist during the certain period, is satisfied, the low-power mode control circuit 71 causes the circuits 61-2 to 61-(N+1), the 128b/130b decoders 62-2 to 62-(N+1), the descramblers 63-2 to 63-(N+1), and the de-framer and error detector 64 to transition from the active state to the inactive state (in particular, low-power state) by sending out a turn-off instruction (e.g., operation stop instruction). Accordingly, the link state of the device 4 transitions from the L0 to the Advanced L0.

In addition, in accordance with a recovery instruction from a power management controller 52 in the device 4 or a recovery instruction from the TLP/EIOS detector 72, the low-power mode control circuit 71 sends out the recovery instruction to the circuits 61-2 to 61-(N+1), the 128b/130b decoders 62-2 to 62-(N+1), the descramblers 63-2 to 63-(N+1), and the de-framer and error detector 64, and each of the circuits transitions from the inactive state to the active state. Accordingly, the link state of the device 4 recovers from the Advanced L0 to the L0.

The power management controller 52 sends out the recovery instruction to the low-power mode control circuit 71 in a case where it is necessary to transmit the TLP to the host 1 during the period when the device 4 is in the Advanced L0.

The TLP/EIOS detector 72 is a circuit which detects the TLP or the EIOS which is transmitted from the host 1, by monitoring the received data of the lane 0 while the link state of the device 4 is in the Advanced L0. When detecting the TLP or the EIOS which is transmitted from the host 1, the TLP/EIOS detector 72 sends out the recovery instruction to the low-power mode control circuit 71.

Figure 7:
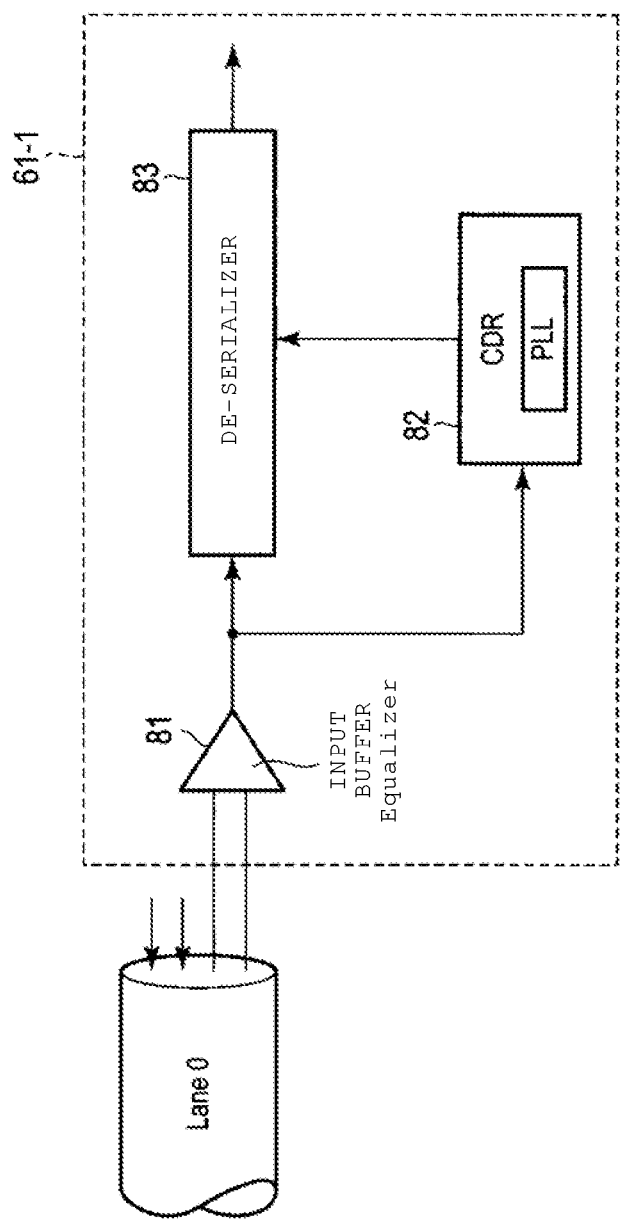
FIG. 7 is a block diagram illustrating several circuits provided in an equalizer and a serializer in the physical layer of FIG. 6.

FIG. 7 illustrates a configuration example of the circuit 61-1 of FIG. 6.

The circuit 61-1 includes a circuit 81 including an input buffer and an equalizer, a clock and data recovery circuit (CDR) 82, a de-serializer 83 and the like. The CDR 82 is a circuit which regenerates the clock signal of the transmission side from the received data, and includes an internal phase-locked loop (PLL) circuit. The CDR 82 is used for establishing and maintaining the bit synchronization (referred to as a bit lock) and the symbol synchronization (referred to as a symbol lock). The de-serializer 83 includes a sampler and a serial to parallel converter circuit.

Similar to the circuit 61-1, each of the circuits 61-2 to circuit 61-(N+1) of FIG. 6 also includes the input buffer and equalizer, the clock and data recovery circuit (CDR), and the de-serializer.

Figure 8:
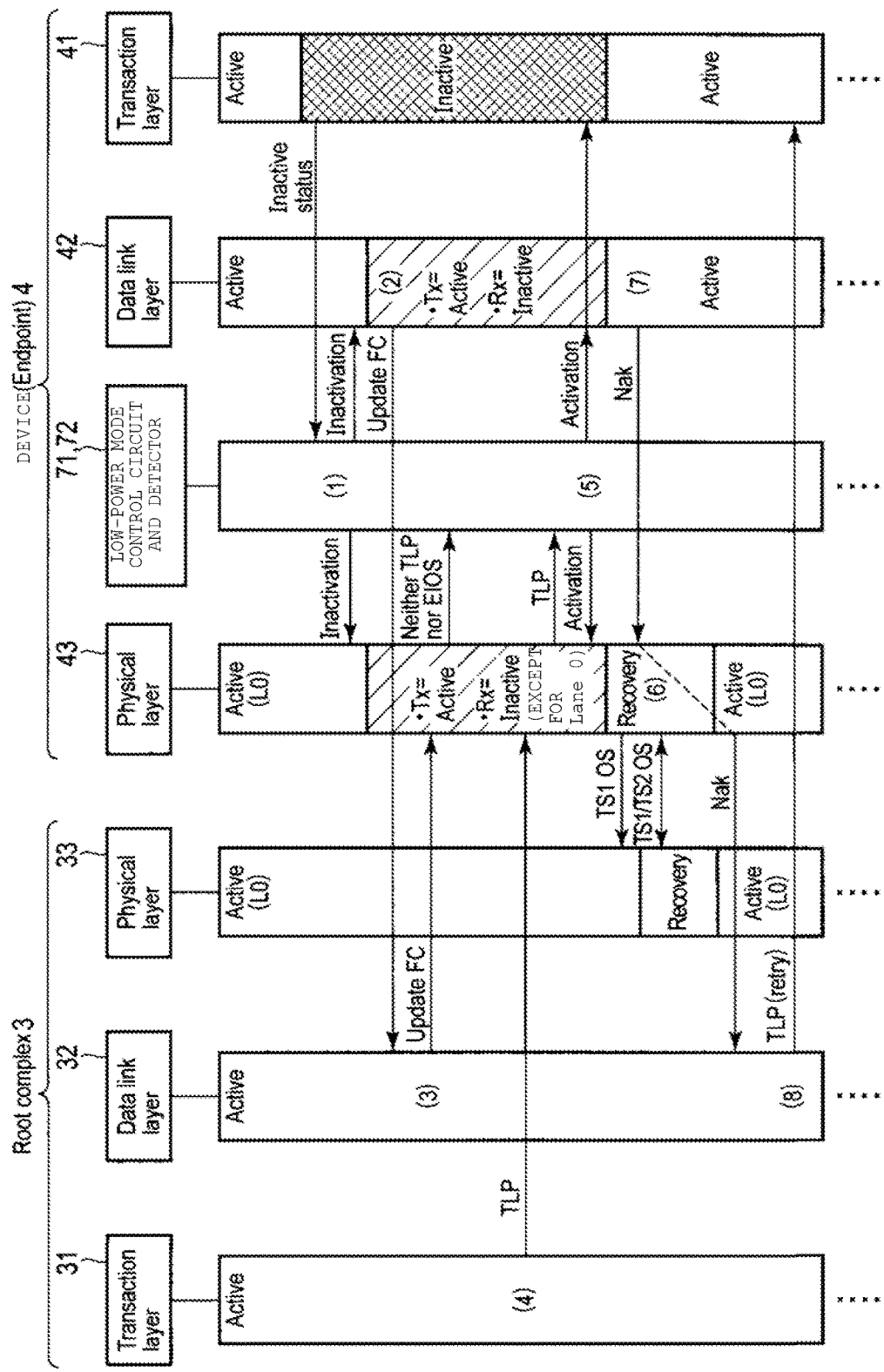
FIG. 8 is a diagram illustrating a sequence for transitioning from L0 to Advanced L0 and a sequence for transitioning from Advanced L0 to L0.

FIG. 8 illustrates a sequence for transitioning from the L0 to the Advanced L0 and a sequence for transitioning from the Advanced L0 to the L0.

(1) When the condition, such as the condition that the data (TLP) to be transmitted to the host 1 does not exist during the period determined by a threshold value, is satisfied, the device 4 starts the transition sequence for causing the state of the device 4 (that is, the link state of the device 4) to transition from the L0 (normal operation state) to the Advanced L0. First, all of the transaction layers 41 may transition from the active state to the inactive state, and the notification of inactive status indicating that the transaction layer 41 is transitioning to the inactive state may be sent out to the low-power mode control circuit and the TLP/EIOS detector 71 and 72 via the data link layer 42. The notification may be sent out to the low-power mode control circuit and the TLP/EIOS detector 71 and 72 from the power management controller 52. In accordance with the reception of the notification, the low-power mode control circuit and the TLP/EIOS detector 71 and 72 may send out the operation stop instruction (inactivation) to each of the receiver circuits (Rx circuit) in the physical layer 43 except for the lane 0, and may bring the receiver circuit of the physical layer 43 (except for the lane 0) to be in the inactive state. In addition, the low-power mode control circuit and the TLP/EIOS detector 71 and 72 may send out the operation stop instruction (inactivation) to the data link layer 42, and may bring the receiver circuit (Rx circuit) of the data link layer 42 to be in the inactive state.

Accordingly, the link state of the device 4 transitions from the L0 to the Advanced L0.

(2) During the period when the device 4 is in the Advanced L0, the transmitter circuit (Tx circuit) of the data link layer 42 and the transmitter circuit (Tx circuit) of all of the lanes of the physical layer 43, are maintained in the active state. Therefore, the device 4 can periodically transmit the Update FC DLLP to the root complex 3 of the host 1. During the period of the Advanced L0, the size of the receiving buffer in the device 4 does not change. Therefore, the Update FC DLLP having the same values are periodically transmitted to the root complex 3 from the device 4. Furthermore, during the period of the logical idle state where the TLP or the DLLP is transmitted, the device 4 can constantly transmit the idle token (IDL token). Accordingly, for example, even when the device 4 transitions from the L0 to the Advanced L0, the host 1 (root complex 3) recognizes as if the device 4 is still in the L0 state.

(3) Therefore, the root complex 3 also periodically transmits the Update FC DLLP to the device 4. In the device 4, each of the receiver circuits (Rx circuit) of the physical layer 43 except for the lane 0 is in the inactive state. Accordingly, the device 4 cannot correctly receive and process the Update FC DLLP. However, during the period of the Advanced L0, the device 4 does not transmit the TLP to the root complex 3 of the host 1, and thus, the receiving buffer size in the root complex 3 does not change. Thus, during the period of the Advanced L0, the root complex 3 periodically transmits the Update FC DLLP having the same value as that before the device 4 transitions to the Advanced L0, to the device 4. Accordingly, there is no problem even when the Update FC DLLP cannot be correctly processed.

(4) In a case where the root complex 3 transmits the TLP to the device 4, the device 4 cannot correctly recognize the TLP. However, since the receiver circuit corresponding to the lane 0 of the physical layer 43 is in the active state, it is possible to receive only the initial byte data (1-byte data) of the TLP. In the initial 1-byte data, at least a part of the STP is included. Therefore, the low-power mode control circuit and the TLP/EIOS detector 71 and 72 can detect that the TLP is received from the root complex 3 by monitoring the received data of the lane 0.

(5) In accordance with the detection of the TLP, the low-power mode control circuit and the TLP/EIOS detector 71 and 72 send out the instruction for requesting the transition from the Advanced L0 to the L0 (activation), to the physical layer 43, the data link layer 42, and the transaction layer 41. In accordance with the instruction, the receiver circuit (Rx circuit) of the data link layer 42 enters the active state, and accordingly, the overall data link layer 42 enters the active state. In addition, in accordance with the instruction, the overall transaction layer 41 enters the active state.

(6) The physical layer 43 starts recovery processing for making all of the lanes operable in the link. In the recovery processing, the physical layer 43 first repeatedly transmits the training sequence (TS1 ordered set: TS1 OS) to each of the lanes. In other words, the physical layer 43 repeatedly transmits the training sequence (TS1 OS) to the host 1 via each of the lanes. The TS1 OS includes link configuration information and clock pattern of the device 4. In accordance with the reception of the TS1 OS, the physical layer 33 of the root complex 3 also starts the recovery processing, and repeatedly transmits the TS1 OS to each of the lanes. Each of the physical layers 43 and 33 establishes the synchronization with the clock of the transmission side (the bit synchronization (bit lock) and the symbol synchronization (symbol lock)) by using the received TS1 OS. When a state where it is possible to correctly receive and process the TS1 OS is achieved, each of the physical layers 43 and 33 repeatedly communicates with the next training sequence (TS2 ordered set: TS2 OS). Each of the physical layers 43 and 33 establishes the synchronization with the clock of the transmission side (the bit synchronization (bit lock) and the symbol synchronization (symbol lock)) by using the received TS2 OS. When a state where each of the physical layers 43 and 33 can correctly receive and process the TS2 OS is achieved, the recovery processing is completed. Each of the device 4 and the root complex 3 is recovered to the L0 (normal operation state).

(7) The data link layer 42 transmits the negative acknowledgement (negative acknowledgement DLLP: Nak DLLP) which requests retransmission of the TLP that cannot be correctly received. After the device 4 is recovered to the L0, the Nak DLLP is transmitted to the root complex 3.

(8) The root complex 3 retransmits the TLP to the device 4.

In the description above, a sequence for transitioning from the Advanced L0 to the L0 in response to with the detection of the TLP transmitted from the root complex 3 is described, but when the EIOS transmitted from the root complex 3 is detected during the period of the Advanced L0, after recovering to the L0 by executing the above-described processing (5) and (6), the device 4 executes the processing for transitioning from the L0 to the L0s. In this case, it is not necessary to execute the above-described processing (7) and (8).

In addition, the device 4 may support a mode that can cause the link state to directly transition from the Advanced L0 to the L0s. In a case where the link state directly transitions from the Advanced L0 to the L0s, when transitioning from the L0s to the L0, that is, when being recovered to the L0, it is also possible to allow the link state to transition in an order of L0s→(5)→(6)→L0. In this case, the operation of (5) may be executed not when the TLP is detected but when the root complex 3 exits from the L0s (that is, when each of the lanes is not in the electrical idle state as the transmission of the ordered set to each of the lanes is started by the root complex 3).

In addition, when the recovery instruction from the power management controller 52 is received during the period of the Advanced L0, the device 4 is also recovered to the L0 by executing the above-described processing (5) and (6). In this case, it is also not necessary to execute the above-described processing (7) and (8).

Figure 9:
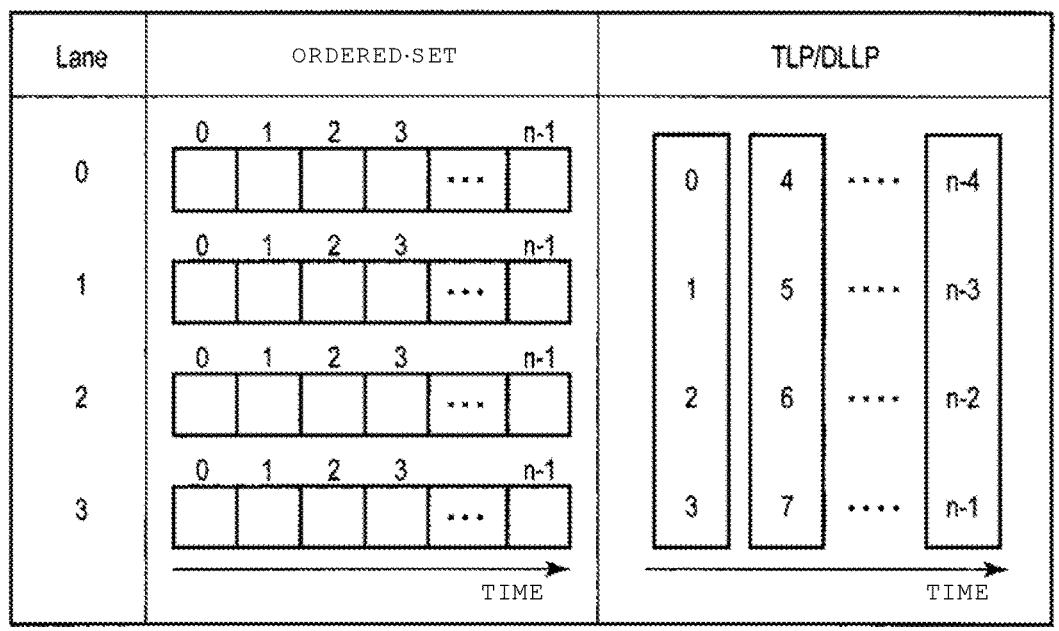
FIG. 9 is a diagram illustrating an ordered set which is serially transmitted in each lane, and transaction layer packet (TLP)/data link layer packet (DLLP) which are framed such that a plurality of pieces of byte data are mapped in all of the lanes in the link.

FIG. 9 illustrates the transmission processing of the ordered set and the transmission processing of the TLP/DLLP.

As illustrated in FIG. 9, the ordered set is serially transmitted to each of the lanes included in the link. For example, in a case where the link is the x4 lane, the same ordered set is serially transmitted to the lane 0, the lane 1, the lane 2, and the lane 3 at the same time.

Meanwhile, the TLP/DLLP is framed such that the initial byte data of the TLP/DLLP is mapped to the lane 0 and a plurality of pieces of byte data which make up the TLP/DLLP is mapped to all of the lanes in the link. For example, in a case where the link is the x4 lane, and the TLP/DLLP includes byte data 0, byte data 1, byte data 2, byte data 3, byte data 4, byte data 5, byte data 6, byte data 7, . . . , and byte data n−1; the byte data 0, the byte data 1, the byte data 2, and the byte data 3 are respectively assigned to the lane 0, the lane 1, the lane 2, and the lane 3; the byte data 4, the byte data 5, the byte data 6, and the byte data 7 are respectively assigned to the lane 0, the lane 1, the lane 2, and the lane 3; and the byte data n−4, the byte data n−3, the byte data n−2, and the byte data n−1 are respectively assigned to the lane 0, the lane 1, the lane 2, and the lane 3.

Figure 10:
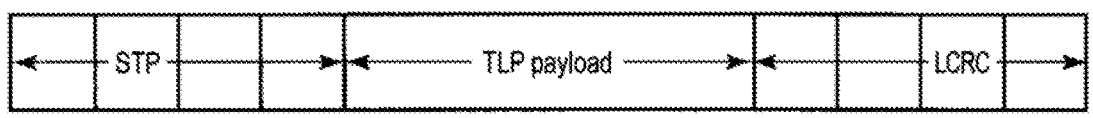
FIG. 10 is a diagram illustrating a TLP layout.

FIG. 10 illustrates a configuration of the TLP.

The TLP includes 4-byte STP, a TLP payload that follows the STP, and 4-byte CRC (LCRC) that follows the TLP payload.

Figure 11:
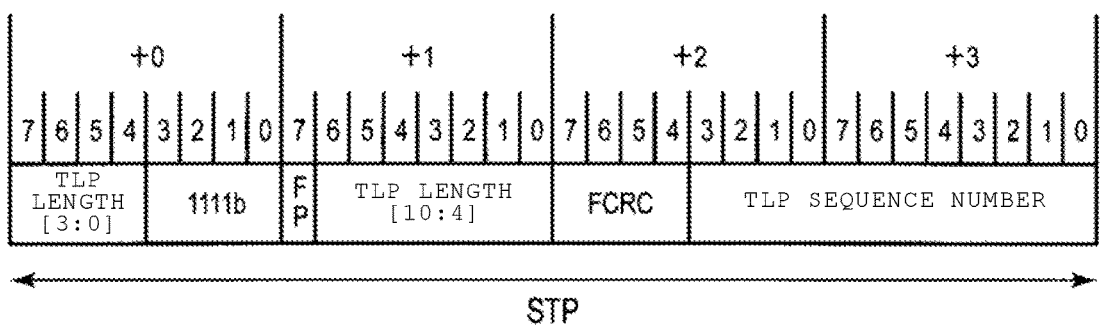
FIG. 11 is a diagram illustrating a configuration of a STP token indicating a start of the TLP.

FIG. 11 illustrates a configuration of a STP token.

The initial 1-byte data of the STP token includes the lowermost 4-bit among 11-bit information indicating the length of the TLP (TLP length [3:0]), and a code "1111b". The TLP length is the total amount of the information to be transmitted including the STP, the TLP payload, and the LCRC. Since the initial 1-byte bit pattern of the STP token is a bit pattern which is intrinsic to the TLP, the device 4 can detect the TLP from only the received data of the lane 0.

FIG. 12 illustrates an example of a TLP layout in an x8 link.

Here, a case where the TLP payload includes the TLP header (DW0 to DW3) and data (1DW) is assumed. Here, the DW expresses 4-byte doubleword. As illustrated in FIG. 12, the TLP is mapped in all of the lanes in the link. In each of the symbol periods when no information is to be transmitted, the idle token (illustrated as IDL in FIG. 12) is transmitted.

FIG. 13 illustrates an example of a relationship of the L0, L0s, L1.0, and the Advanced L0.

In the Advanced L0, since the plurality of receiver circuits of the physical layer 43 (except for the lane 0) is in the inactive state, it is possible to reduce the power consumption to be smaller than that of the L0 state. The power consumption in the Advanced L0 changes depending on how the inactive state of each of the receiver circuits is achieved. For example, the inactive state of each of the receiver circuits may be defined such that the power consumption in the Advanced L0 is a substantially intermediate level between a power consumption in the L0s and the power consumption in the L1.0.

Figure 14:
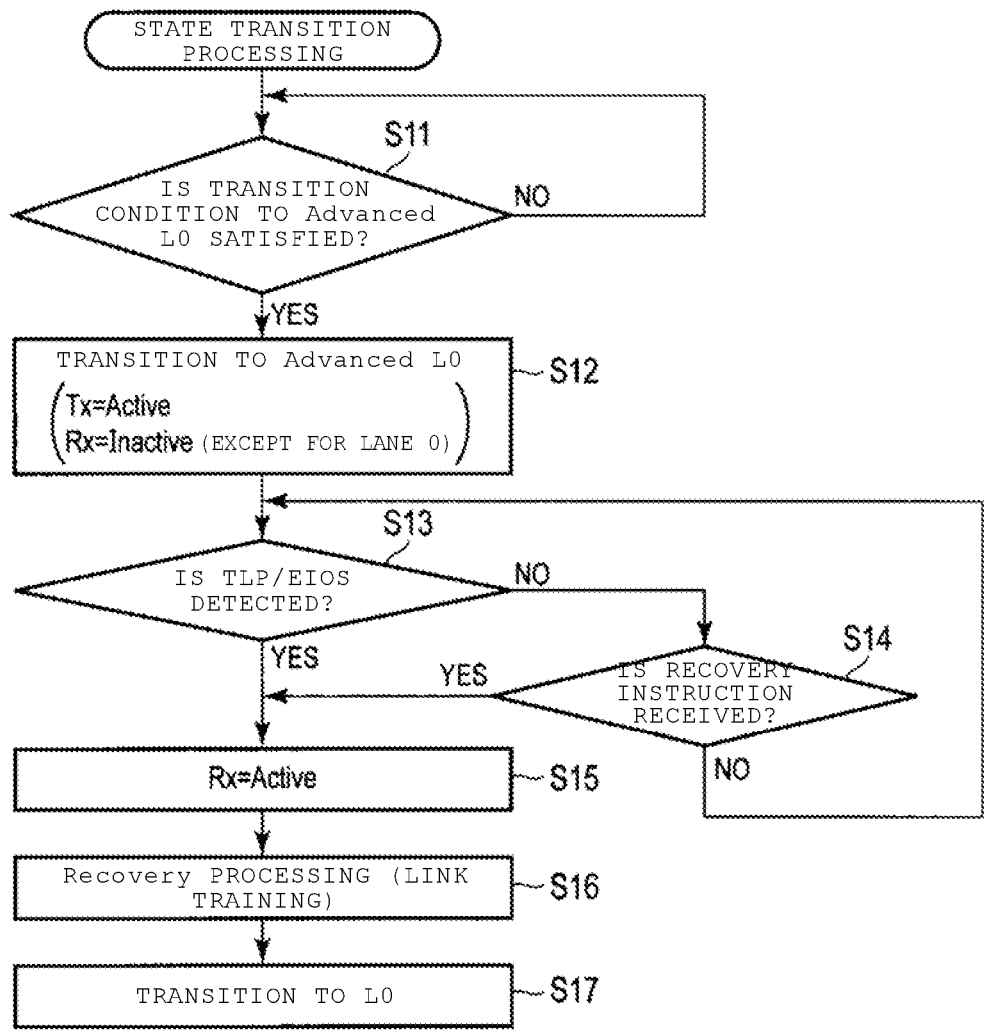
FIG. 14 is a flowchart illustrating an order of state transition processing executed by the electronic device of the embodiment.

The flowchart of FIG. 14 illustrates an order of state transition processing executed in the device 4.

The control circuit (including the low-power mode control circuit and the TLP/EIOS detector 71 and 72) of the device 4 determines whether or not the transition condition to the Advanced L0 is satisfied while the link state of the device 4 is the L0 (step S11). An example of the transition condition to the Advanced L0 may include the condition that the data (TLP) to be transmitted to the host 1 does not exist during the period determined by the threshold value.

When the transition condition to the Advanced L0 is satisfied (YES in step S11), the control circuit causes the link state of the device 4 to transition from the L0 to the Advanced L0 without executing the negotiation with the host 1 regardless whether or not the ASPM L0s/ASPM L1.0 is enabled (step S12). In step S12, the control circuit maintains the plurality of transmitter circuits (Tx circuit) of the physical layer 43 in the active state is maintained, and brings the plurality of receiver circuits of the physical layer 43 (except for the lane 0) in the inactive state (step S12). Furthermore, the control circuit may bring the receiver circuit of the data link layer 42 and the entire transaction layer 41 respectively in the inactive state.

Figure 15:
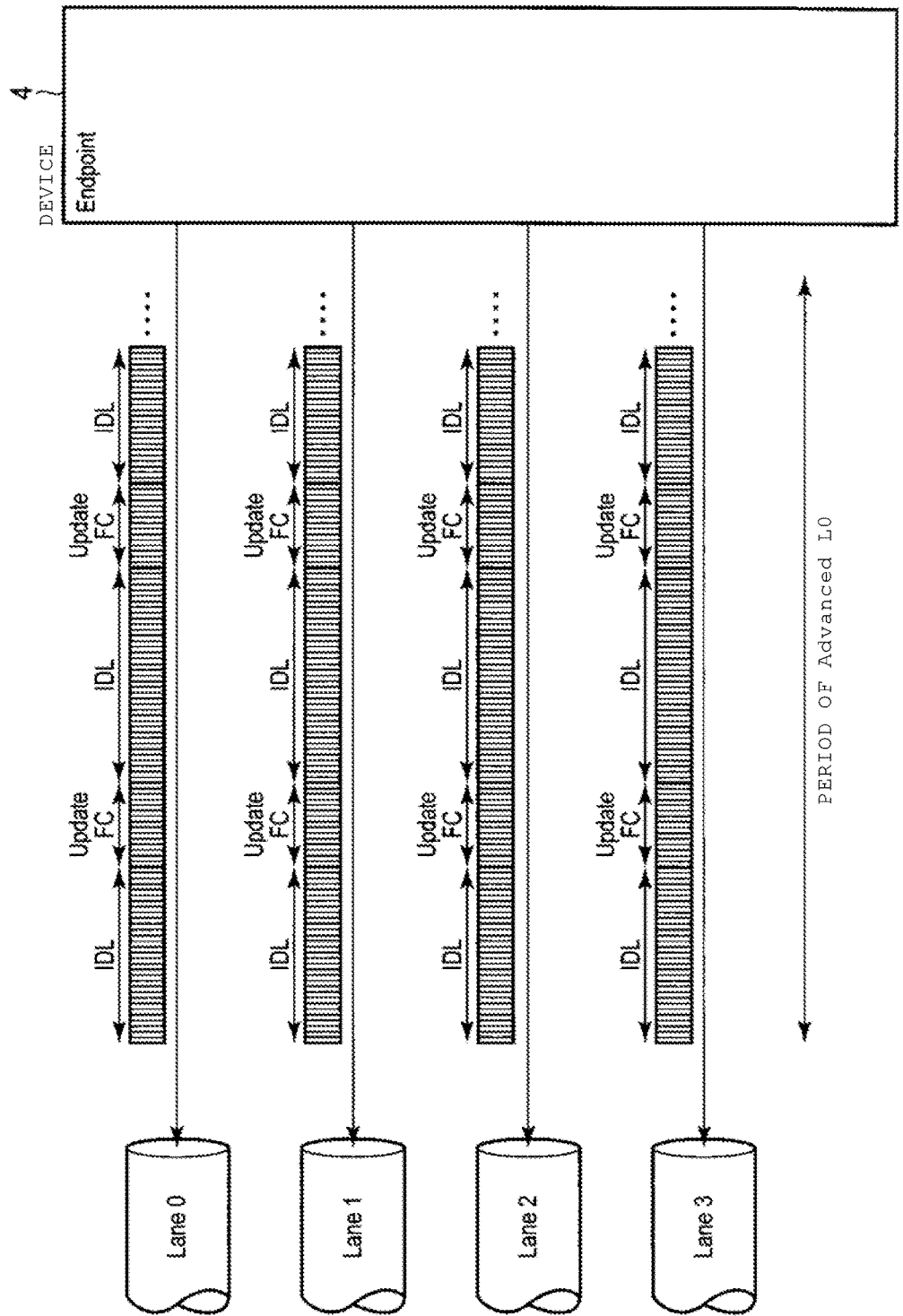
FIG. 15 is a diagram illustrating an idle token and Update FC DLLP which are transmitted to a host from the electronic device of the embodiment during a period when the electronic device of the embodiment is in Advanced L0.

While the link state of the device 4 is the Advanced L0, as illustrated in FIG. 15, the device 4 (in particular, the physical layer 43) periodically transmits the Update FC DLLP to the host 1, and in the period when the Update FC DLLP to be transmitted does not exist, the idle token (IDL) which indicates the logical idle state is always transmitted to the host 1.

While the link state of the device 4 is the Advanced L0, the control circuit monitors the received data of the lane 0 (that is, the data to be received by the receiver circuit of the physical layer 43 that corresponds to the lane 0), and determines whether or not the TLP/EIOS transmitted from the host 1 is detected based on the received data of the lane 0 (step S13 of FIG. 14). Furthermore, while the link state of the device 4 is the Advanced L0, the control circuit also determines whether or not the recovery instruction from the power management controller 52 in the device 4 is received (step S14).

While the link state of the device 4 is the Advanced L0, when the TLP/EIOS from the host 1 is detected based on the received data of the lane 0 (YES of step S13), or when the recovery instruction is received from the power management controller 52 (YES of step S14), the control circuit brings all of the receiver circuits of the physical layer 43 in the active state in order to start the transition sequence from the Advanced L0 to the L0 (step S15). In step S15, the control circuit brings the receiver circuit of the data link layer 42 and the transaction layer 41 in the active state.

The physical layer 43 executes the recovery processing for making the link operable between the host 1 and the device 4 (step S16). When the recovery processing is completed, the link state of the device 4 transitions from the recovery state to the L0 (step S17). The recovery state is a link state where the recovery processing for reestablishing the synchronization with the clock of the transmission side is executed.

FIG. 15 illustrates the idle token and the Update FC DLLP which are transmitted from the device 4 to the host 1 during the period when the device 4 is in the Advanced L0.

As described above, while the device 4 is in the Advanced L0, all of the transmitter circuits (Tx circuit) corresponding to all of the lanes (here, the lane 0 to the lane 3) are maintained in the active state. Thus, during the period of the Advanced L0, the device 4 can periodically transmit the Update FC DLLP to each of the lanes. Furthermore, during the period when the Update FC DLLP to be transmitted does not exist, the idle token (IDL) which indicates the logical idle state is always transmitted to each of the lanes by the device 4.

Figure 16:
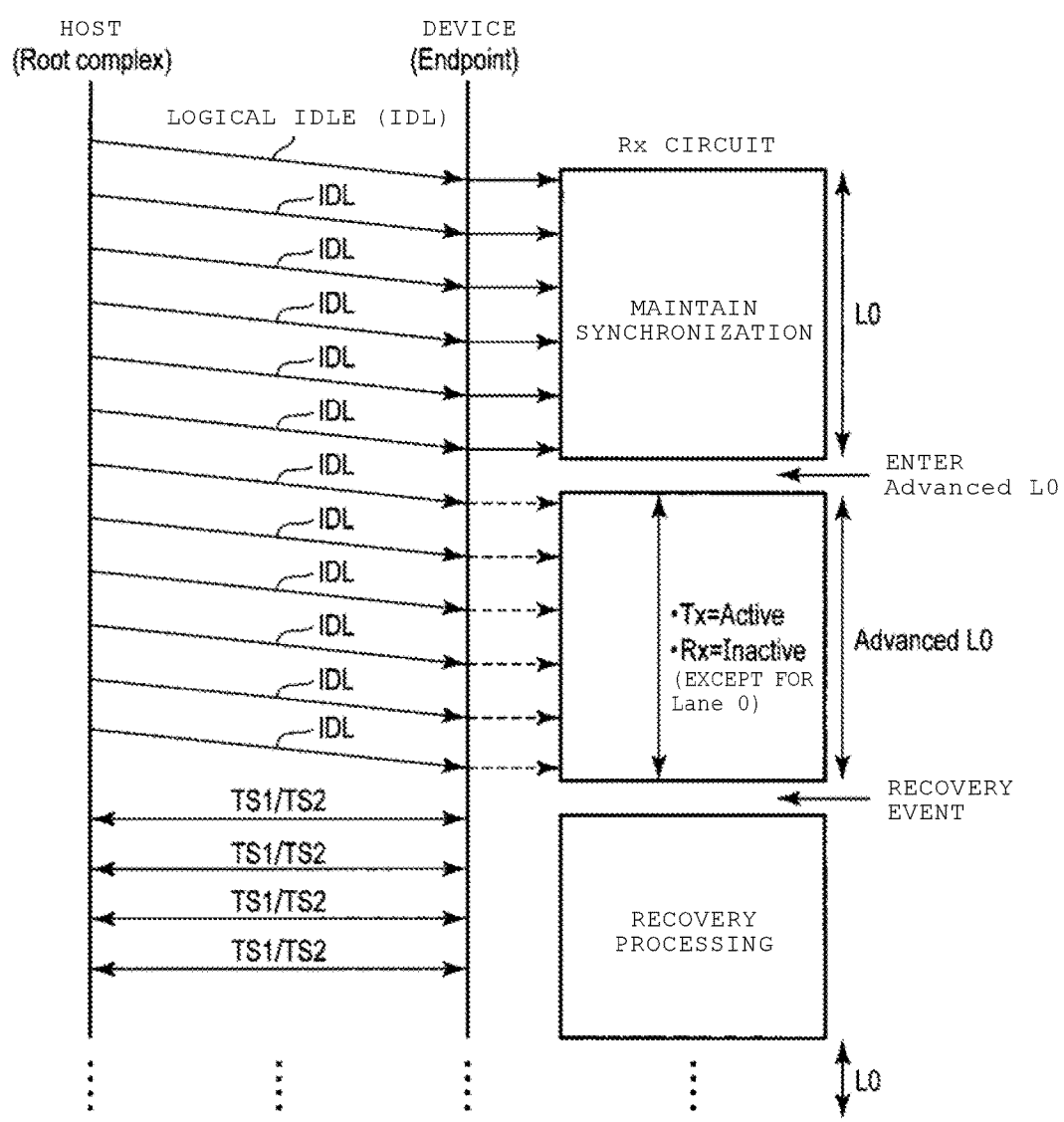
FIG. 16 is a diagram illustrating a change in synchronized state of an Rx circuit.

FIG. 16 illustrates a change in synchronized state of the Rx circuit.

During the period when the device 4 is in the L0 state, and during the period when the TLP or the DLLP to be transmitted does not exist, the root complex 3 of the host 1 always transmits the idle token (illustrated as the IDL in FIG. 16) indicating the logical idle state, to the device 4. Thus, during the period when the device 4 is in the L0 state, the device 4 can maintain the state where the synchronization (the bit synchronization, the symbol synchronization and the like) with the clock signal of the transmission side (i.e., side of root complex 3) is established.

When the device 4 enters the Advanced L0, the plurality of receiver circuits of the physical layer 43 (except for the lane 0) enters the inactive state. Therefore, when the device 4 once enters the Advanced L0, it is not possible to maintain the synchronization (bit synchronization, the symbol synchronization and the like) with the clock signal of the transmission side (i.e., side of root complex 3). Therefore, when the device 4 transitions from the Advanced L0 to the L0, the recovery processing for making the link operable by establishing the bit synchronization, the symbol synchronization and the like, is executed.

Figure 17:
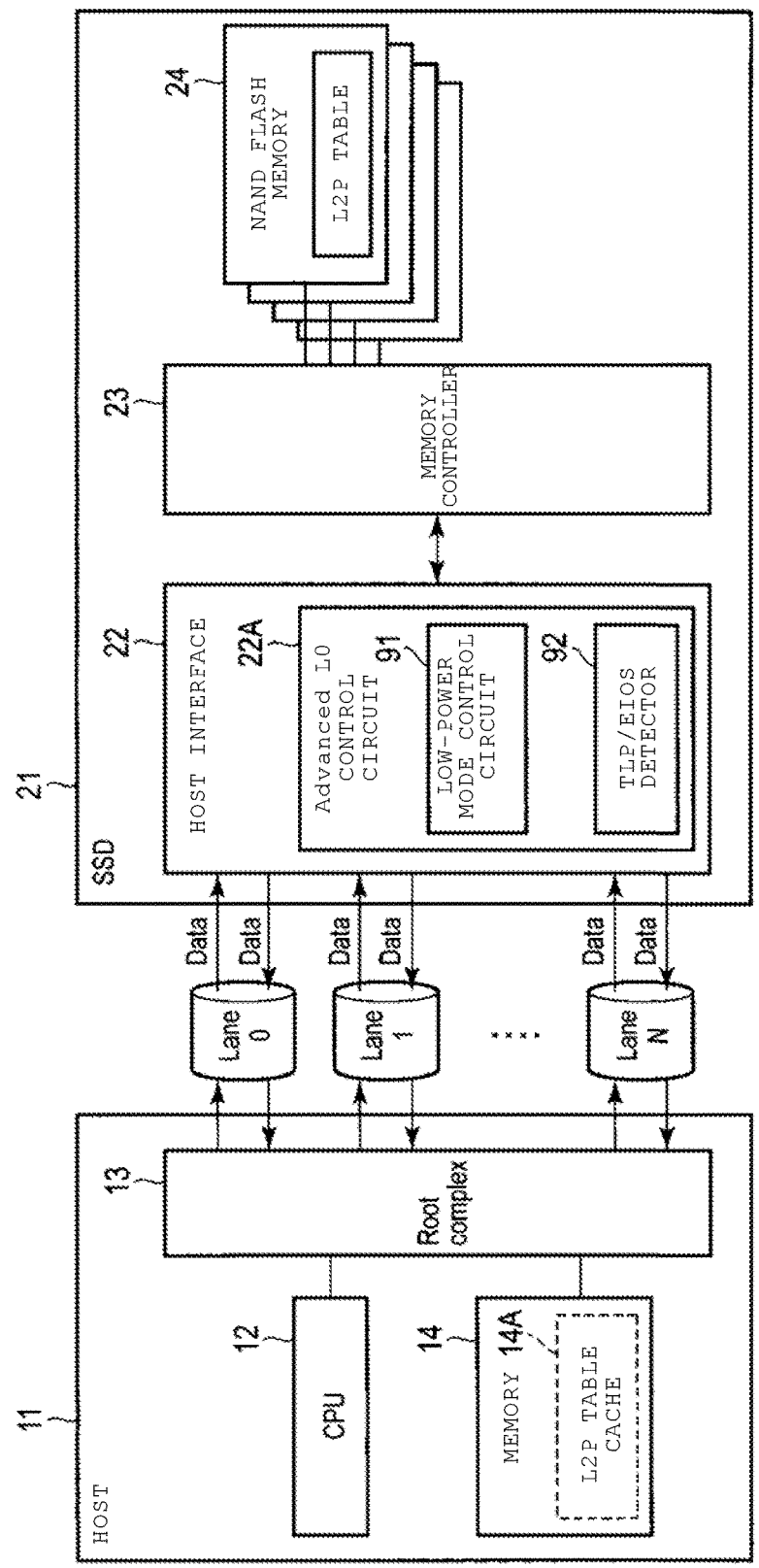
FIG. 17 is a block diagram of a storage device in which a configuration of the electronic device of the embodiment is employed.

FIG. 17 illustrates a storage device in which the configuration of the device 4 is employed.

The storage device is implemented, for example, as a solid state drive (SSD) 21 including a NAND flash memory.

The SSD 21 can be connected to a host (host device) 11 via the serial interface including the link having the lane 0, the lane 1, . . . , and the lane N.

The host 11 includes a CPU (host CPU) 12, a root complex 13, and a memory 14. The CPU 12 is a processor which controls components in the host 2. The CPU 12 executes various programs loaded on the memory 14 from the SSD 21 or other storage devices. The programs include an operating system and various application programs. The root complex 13 has a configuration similar to the root complex 3 described in FIG. 1.

A read command, a write command, and write data with respect to the SSD 21 are transmitted to the SSD 21 from the host 11 by each of the corresponding TLP.

The SSD 21 includes a host interface 22, a memory controller 23, and a non-volatile memory (NAND flash memory) 24. The host interface 22 and the memory controller 23 may be implemented as different circuit elements in the circuit such as a SoC. In general, the NAND flash memory 24 includes a plurality of NAND flash memory chips.

The host interface 22 is an interface circuit which communicates with the host 11 via the link including the lane 0, the lane 1, . . . , and the lane N. The host interface 22 corresponds to the transaction layer 41, the data link layer 42, and the physical layer 43 of the device 4 of FIG. 1. In other words, the host interface 22 includes the plurality of transmitter circuits that correspond to the plurality of lanes (the lane 0, the lane 1, . . . , and the lane N), and the plurality of receiver circuits that correspond to the plurality of lanes (the lane 0, the lane 1, . . . , and the lane N). Each of the transmitter circuits transmits data via the differential signal wire pair for transmission of the corresponding lane. Each of the receiver circuits receives data via the differential signal wire pair for reception of the corresponding lane.

Furthermore, the host interface 22 includes an Advanced L0 control circuit 22A for causing the state of the host interface 22 to transition between the L0 (normal operation state) and the Advanced L0. The Advanced L0 control circuit 22A includes a low-power mode control circuit 91 and a TLP/EIOS detector 92. The low-power mode control circuit 91 and the TLP/EIOS detector 92 respectively execute an operation which is the same as that of the low-power mode control circuit 71 and the TLP/EIOS detector 72 described in FIG. 6.

The memory controller 23 functions as a flash translation layer (FTL) configured to execute data management and program management of the NAND flash memory 24. The data management executed by the FTL includes management of mapping information which indicates correspondence between each of the logical addresses and each of the physical addresses of the NAND flash memory 24, and the like. The logical address is an address used by the host 1 for designating the position in a logical space of the SSD 3. As the logical address, a logical block address (addressing) (LBA) can be used.

The mapping management between each of the logical addresses and each of the physical addresses is executed by using a logical-to-physical address translation table (L2P table). The memory controller 23 manages the mapping between each of the logical addresses and each of the physical addresses by a predetermined management size unit, by using the L2P table. The physical address that corresponds to a certain logical address indicates the most recent physical storage position in the NAND flash memory 24 in which the data of the certain logical address is written. The L2P table may be loaded on a DRAM or the like in the SSD 3 from the NAND flash memory 24 at a timing when the power of the SSD 21 is ON. Alternatively, for example in a case where the SSD 3 is configured not to include the DRAM, a part or the entirety of the L2P table may be accommodated as an L2P table cache 14A in the memory 14 in the host 11.

Block management includes defective block management, wear leveling, garbage collection and the like. The wear leveling is an operation for leveling the wear of each of the physical blocks.

In the garbage collection, in order to increase the number of free blocks in which the data can be written, the memory controller 23 moves valid data in several blocks in which valid data and invalid data are mixed with each other to another block (for example, free block). Here, the valid data is data referred from the L2P table, and means data which has a may be read from the host 11 later. The invalid data means data which no longer may be read from the host 11. For example, the data associated with a certain logical address is the valid data, and data which is not associated with any logical address is the invalid data. In addition, the memory controller 23 updates the L2P table, and maps each of the logical addresses of the moved valid data to the physical address of a movement destination. As the valid data is moved to another block, the block which only has the invalid data is released as the free block. Accordingly, the block can be reused after erasure.

The memory controller 23 executes command processing or the like for processing various commands received from the host 11, in addition to the processing of the FTL.

In the embodiment, in a case where the data to be transmitted to the host 11, for example, the TLP, the TLP (completion) indicating command completion and the like does not exist during the period determined by the threshold value, the host interface 22 can rapidly transition from the L0 to the Advanced L0 without executing the negotiation with the host regardless whether or not the L0s/L1.0 is enabled. Accordingly, it is possible to reduce the power consumption of the host interface 22.

While the host interface 22 is in the Advanced L0, when the TLP, such as the read/write command, is transmitted from the host 11, the Advanced L0 control circuit 22A recovers the host interface 22 from the Advanced L0 to the L0.

In addition, while the host interface 22 is in the Advanced L0, as necessary, the memory controller 23 may start the garbage collection. In this case, in a case where a part or the entirety of the L2P table is accommodated as the L2P table cache 14A in the memory 14 in the host 11, when it is necessary to update the L2P table cache 14A by executing the garbage collection, that is, when it is necessary to transmit the TLP for the write request for updating the L2P table cache 14A to the host 1, the memory controller 23 may send out the recovery instruction to the Advanced L0 control circuit 22A of the host interface 22. Accordingly, it is possible to recover the host interface 22 from the Advanced L0 to the L0. After the host interface 22 is recovered to the L0, the memory controller 23 may transmit the TLP for the write request for updating the L2P table cache 14A to the host 11 via the host interface 22.

As described above, according to the embodiment, the Advanced L0 where the plurality of transmitter circuits which transmit data via the differential signal wire pair for transmission of each of the corresponding lanes are maintained in the active state, and the plurality of receiver circuits (except for one specific lane) which receive data via the differential signal wire pair for reception of each of the corresponding lanes enters the inactive state, is defined.

In the Advanced L0, the plurality of transmitter circuits are maintained in the active state. Therefore, since the differential signal wire pair for transmission of each of the lanes is not in the electrical idle state, it is possible to allow the host 1 to recognize as if the device 4 is still in the L0. Therefore, the device 4 can transition to the Advanced L0 without executing the negotiation between the host 1 and the device 4 regardless whether or not the ASPM L0s/ASPM L1.0 is enabled by the host.

In addition, in the Advanced L0, since only the receiver circuit that corresponds to one lane is in the active state, it is possible to recover the state of the device 4 to the L0

(normal operation state) in response to the reception of the specific information from the host 1.

Therefore, only under the condition on the device 4 side, the device 4 can rapidly transition to the Advanced L0, and accordingly, it is possible to reduce the power consumption of the device 4.

In addition, in the embodiment, the receiver circuits of all of the lanes except for the receiver circuit that corresponds to the lane 0 are in the inactive state, but this is for making it possible to recover from the new low-power state (Advanced L0) to the L0 in response to the detection of the TLP from the host 1. The lane maintained in the active state may not be necessarily the lane 0. The EIOS from the host 1 is serially transmitted to each of the lanes. Thus, even in a case where only the receiver circuit corresponding to one lane different from the lane 0 is maintained in the active state, in response to the detection of the EIOS from the host 1, it is possible to recover the lane state from the new low-power state (Advanced L0) to the L0.

In addition, in the embodiment, the serial interface based on the PCI Express specification is illustrated as an example. However, the configuration of the embodiment can be employed in various serial interface standards including the link having the plurality of lanes. Examples of the serial interface standard include MIPI D-PHY, MIPI M-PHY, MIPI C-PHY and the like which are defined by MIPI alliance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device which is connectable with a host via a serial interface including a link configured with a plurality of lanes, each of which includes a differential signal wire pair for transmission and a differential signal wire pair for reception, the device comprising:
    a plurality of transmitter circuits that respectively correspond to the plurality of lanes, and is configured to transmit data via the differential signal wire pair for transmission of each of the corresponding lanes;
    a plurality of receiver circuits that respectively correspond to the plurality of lanes, and is configured to receive data via the differential signal wire pair for reception of each of the corresponding lanes; and
    a control circuit configured to allow a state of the electronic device to transition from a normal operation state in which the plurality of transmitter circuits and the plurality of receiver circuits are in an active state, to a first low-power state in which the plurality of transmitter circuits are maintained in an active state and the plurality of receiver circuits are in an inactive state except for one of the receiver circuits corresponding to one lane among the plurality of lanes.

2. The electronic device according to claim 1, wherein the one lane among the plurality of lanes is a lane to which lane number 0 is assigned.

3. The electronic device according to claim 1, wherein the control circuit is configured to allow the state of the electronic device to transition from the normal operation state to the first low-power state, in a case where data to be transmitted to the host does not exist for a first period.

4. The electronic device according to claim 1, wherein the control circuit is configured to allow the state of the electronic device to transition from the normal operation state to the first low-power state without executing negotiation with the host.

5. The electronic device according to claim 1, wherein the control circuit is configured to allow the state of the electronic device to transition from the first low-power state to the normal operation state in a case where reception of specific information is detected on the one lane.

6. The electronic device according to claim 5, wherein the specific information includes electrical idle ordered set transmitted from the host.

7. The electronic device according to claim 5, wherein the one lane among the plurality of lanes is a lane to which the lane number 0 is assigned, and
    the specific information includes a transaction layer packet transmitted from the host.

8. The electronic device according to claim 7, wherein the control circuit is configured to transmit a retransmission request of the transaction layer packet to the host after the state of the electronic device transitions from the first low-power state to the normal operation state.

9. The electronic device according to claim 1, wherein the control circuit is configured to allow the state of the electronic device to transition from the first low-power state to the normal operation state in a case where it is necessary to transmit the transaction layer packet to the host while the state of the electronic device is in the first low-power state.

10. The electronic device according to claim 1, wherein the control circuit is configured to transmit a training sequence to the host via each of the plurality of lanes in a case where it is necessary to transmit a transaction layer packet to the host, or the reception of specific information is detected on the one lane while the state of the electronic device is the first low-power state.

11. The electronic device according to claim 1, wherein the serial interface is a serial interface based on a PCI Express specification.

12. A power management method executed by an electronic device which is connectable with a host via a serial interface,
    the electronic device including
        a link configured with a plurality of lanes, each of which includes a differential signal wire pair for transmission and a differential signal wire pair for reception,
        a plurality of transmitter circuits that respectively correspond to the plurality of lanes, and is configured to transmit data via the differential signal wire pair for transmission of each of the corresponding lanes,
        a plurality of receiver circuits that respectively correspond to the plurality of lanes, and is configured to receive data via the differential signal wire pair for reception of each of the corresponding lanes, and
        a control circuit,
    the method comprising:
    causing a state of the electronic device to transition from a normal operation state in which the plurality of transmitter circuits and the plurality of receiver circuits are in an active state, to a first low-power state in which the plurality of transmitter circuits are maintained in an active state and the plurality of receiver circuits are in an inactive state except for one of the receiver circuits corresponding to one lane among the plurality of lanes; and causing the state of the electronic device to transition from the first low-power state to the normal operation state in a case where reception of specific information is detected on the one lane.

13. The power management method according to claim 12,
wherein the one lane among the plurality of lanes is a lane to which lane number 0 is assigned.

14. The power management method according to claim 12,
wherein causing the state of the electronic device to transition from the normal operation state to the first low-power state, includes causing the state of the electronic device to transition from the normal operation state to the first low-power state in a case where data to be transmitted to the host does not exist for a first period.

15. The power management method according to claim 12,
wherein the specific information includes electrical idle ordered set transmitted from the host.

16. The power management method according to claim 12, wherein
the one lane among the plurality of lanes is a lane to which the lane number 0 is assigned, and
the specific information includes a transaction layer packet transmitted from the host.

17. A storage device which is connectable with a host via a serial interface including a link configured with a plurality of lanes, each of which includes a differential signal wire pair for transmission and a differential signal wire pair for reception, the device comprising:
a nonvolatile memory;
a controller for the nonvolatile memory; and
a host interface circuit including
a plurality of transmitter circuits that respectively correspond to the plurality of lanes, and is configured to transmit data via the differential signal wire pair for transmission of each of the corresponding lanes,
a plurality of receiver circuits that respectively correspond to the plurality of lanes, and is configured to receive data via the differential signal wire pair for reception of each of the corresponding lanes, and
a control circuit configured to allow a state of the storage device to transition from a normal operation state in which the plurality of transmitter circuits and the plurality of receiver circuits are in an active state, to a first low-power state in which the plurality of transmitter circuits are maintained in an active state and the plurality of receiver circuits are in an inactive state except for one of the receiver circuits corresponding to one lane among the plurality of lanes.

18. The storage device according to claim 17,
wherein the control circuit is configured to allow the state of the storage device to transition from the normal operation state to the first low-power state, in a case where data to be transmitted to the host does not exist for a first period.

19. The storage device according to claim 17,
wherein the control circuit is configured to allow the state of the storage device to transition from the normal operation state to the first low-power state without executing negotiation with the host in a case where the data to be transmitted to the host does not exist during the first period.

20. The electronic device according to claim 17,
wherein the control circuit is configured to allow the state of the storage device to transition from the first low-power state to the normal operation state in a case where reception of specific information is detected on the one lane.

* * * * *